United States Patent
Blichmann et al.

(10) Patent No.: US 10,551,072 B1
(45) Date of Patent: Feb. 4, 2020

(54) STRATEGIC HEAT SHIELD AND BURNER ASSEMBLY

(71) Applicants: John Blichmann, Lafayette, IN (US); Blichmann Enginerring, LLC, Lafayette, IN (US)

(72) Inventors: John Blichmann, Lafayette, IN (US); Robert P. Fletcher, West Lafayette, IN (US); Mark Jewell, Stockwell, IN (US)

( * ) Notice: Subject to any disclaimer, the term of this patent is extended or adjusted under 35 U.S.C. 154(b) by 0 days.

(21) Appl. No.: 15/338,063

(22) Filed: Oct. 28, 2016

Related U.S. Application Data

(60) Provisional application No. 62/248,068, filed on Oct. 29, 2015.

(51) Int. Cl.
| | |
|---|---|
| *F24C 15/28* | (2006.01) |
| *F23D 14/76* | (2006.01) |
| *F24C 15/08* | (2006.01) |
| *C12C 13/06* | (2006.01) |
| *F24C 3/14* | (2006.01) |

(52) U.S. Cl.
CPC ............. *F24C 15/28* (2013.01); *C12C 13/06* (2013.01); *F23D 14/76* (2013.01); *F24C 3/14* (2013.01); *F24C 15/086* (2013.01)

(58) Field of Classification Search
CPC ............. F24C 15/28; F24C 15/36; B42F 5/00
USPC .......................................................... 126/40
See application file for complete search history.

(56) References Cited

U.S. PATENT DOCUMENTS

| | | | | |
|---|---|---|---|---|
| 4,108,142 A * | 8/1978 | Barson | ................ | A47J 37/0682 126/25 R |
| 4,715,161 A * | 12/1987 | Carraro | .................... | E04B 9/127 52/714 |
| 4,809,671 A * | 3/1989 | Vallejo, Jr. | ................ | F24C 3/14 126/25 R |
| 5,038,749 A * | 8/1991 | Jerry | ......................... | F24C 3/14 126/38 |
| 5,531,154 A * | 7/1996 | Perez, III | ................ | A47J 36/26 126/25 R |
| 5,979,428 A * | 11/1999 | Greene, Jr. | ............. | F24C 15/28 126/38 |
| 6,213,115 B1 * | 4/2001 | Anderson | ............... | A47J 33/00 126/46 |
| 6,725,856 B1 * | 4/2004 | Barbour | .................... | F24C 3/14 126/304 R |
| 7,708,006 B2 * | 5/2010 | Sun | ........................ | F24C 15/107 126/211 |
| 7,861,705 B2 * | 1/2011 | Hulsey | .................... | A47J 37/07 126/25 A |
| 7,926,417 B2 * | 4/2011 | Shingler | ............. | A47J 37/0713 126/40 |
| 8,151,786 B2 * | 4/2012 | May | ........................ | F24C 3/126 126/214 D |
| 8,820,310 B1 * | 9/2014 | Plott | ................... | A47J 37/0713 126/30 |

(Continued)

*Primary Examiner* — Kenneth Rinehart
*Assistant Examiner* — Deepak A Deean
(74) *Attorney, Agent, or Firm* — Tyler B. Droste; Gutwein Law

(57) ABSTRACT

A strategic heat shield and burner assembly configured to reduce the heat of the surface of a vessel for food preparation, and particularly for brewing beer. The reduction in heat dramatically improves the longevity of the instrumentation affixed to the surface of the vessel and the safety of the brewing vessel to users in proximity to the vessel during operation.

14 Claims, 7 Drawing Sheets

(56) References Cited

U.S. PATENT DOCUMENTS

| | | | | |
|---|---|---|---|---|
| 2005/0109330 A1* | 5/2005 | Pestrue | ............... | F24C 3/14 |
| | | | | 126/25 R |
| 2010/0154770 A1* | 6/2010 | Zhou | ............... | F24C 3/14 |
| | | | | 126/42 |
| 2010/0275897 A1* | 11/2010 | May | ............... | F24C 3/126 |
| | | | | 126/42 |
| 2015/0034066 A1* | 2/2015 | Plott | ............... | A47J 37/0713 |
| | | | | 126/25 R |

* cited by examiner

STRATEGIC HEAT SHIELD AND BURNER ASSEMBLY

CROSS-REFERENCE TO RELATED APPLICATION

This U.S. Patent Application claims priority to U.S. Provisional Application 62/248,068 filed Oct. 29, 2015, the disclosure of which is considered part of this disclosure and is hereby incorporated by reference in its entirety.

FIELD OF THE INVENTION

This invention relates generally to a food and beverage preparation process that utilizes a burner and kettle, such as a beer brewing process. For example, this invention relates to applying a heat shield to the burner for strategically mitigating heat dispersion on the exterior surface of the kettle used during the brewing process.

BACKGROUND

In the beer brewing industry and more particularly among small scale or home beer making industry, it is common to use burners to heat various kettles during the beer making process. During the brewing process, burners can emit anywhere from about 15,000 BTU to about 185,000 BTUs. Many of commercially available kettles feature a variety of auxiliary instruments near the front panel of the kettle, such as thermostats, thermometers, or sensors to monitor the temperature or specific gravity of the liquid inside the kettles. Additionally, these kettles can use valves located near the bottom of the kettle for transferring or draining liquid from the kettles. The heat on the surface of the kettles can reach temperatures between about 200° F. and about 400° F., which is especially deleterious to the electronics, instruments, valves, and other equipment located on the front panel, leading to premature malfunctioning or failure.

Current burner assemblies do not include any feature, such as an attachment or other component, that helps prevent or mitigate the excessive heat flow to the front surface of the kettle. Some cruder approaches have attempted to mitigate the excessive heat by merely placing a piece of metal under the kettle near the front surface of the burner to block the excessive heat, but this method can create a greater risk by making the kettle unstable on the burner stand. Additionally, this approach results in a piece of metal protruding away from the burner and kettle that can be in excess of about 800° F., creating a more hazardous situation in which individuals might be burned from the protruding metal. The radiative heat from these flat pieces of metal, because of the excessive heat, continue to transfer unacceptable levels of heat to the auxiliary instruments and equipment.

There exists a need to allow for consistent heat transfer to the kettle for expedient heating while also preventing excessive heat from damaging the instruments on the front panel of the kettle. Additionally, there is a need to maintain the user's safety from excessive heat and to protect protruding instruments or attachments throughout the brewing process.

BRIEF SUMMARY OF THE INVENTION

In one aspect, this disclosure is related to a strategic heat shield and burner assembly comprising a stand having a plurality supporting legs, a central member defining a wall with a central opening there through, and at least one vessel support member. The legs are coupled to the central member and the vessel support member and can be located above the top edge of the central member. Positioned centrally within the central member and coupled therein is a burner. The burner can provide heat to a vessel placed on the vessel support member. Coupled to the stand is a heat shield. The top edge of the heat shield is positioned relative to the vessel support member, creating a level plane for a vessel to sit on while in use with the burner. The heat shield is configured to shield a portion of the vessels exterior side wall from excessive heat created by the burner.

In another aspect, this disclosure relates to strategic heat shield with a definite design burner assembly having a circular shape with a wind guard surrounding a burner comprising a heat shield of a generally curvilinear shape. The heat shield has a top edge and a bottom edge shaped to match a definite shape of the wind guard of the burner assembly. Located along the bottom edge of the heat shield are a plurality of tabs configured to couple to the wind guard. The top edge of the heat shield can be flat and configured to flushly support a vessel. The heat shield can be configured to deflect heat from the burner away from an external environment proximate to the exterior surface of the heat shield.

In another aspect, this disclosure is related to a strategic heat shield attachment for a burner assembly. The heat shield can be configured to couple to a burner assembly without the use of fasteners. Furthermore, the heat shield can be configured to deflect excessive heat from escaping a portion of the burner.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1:
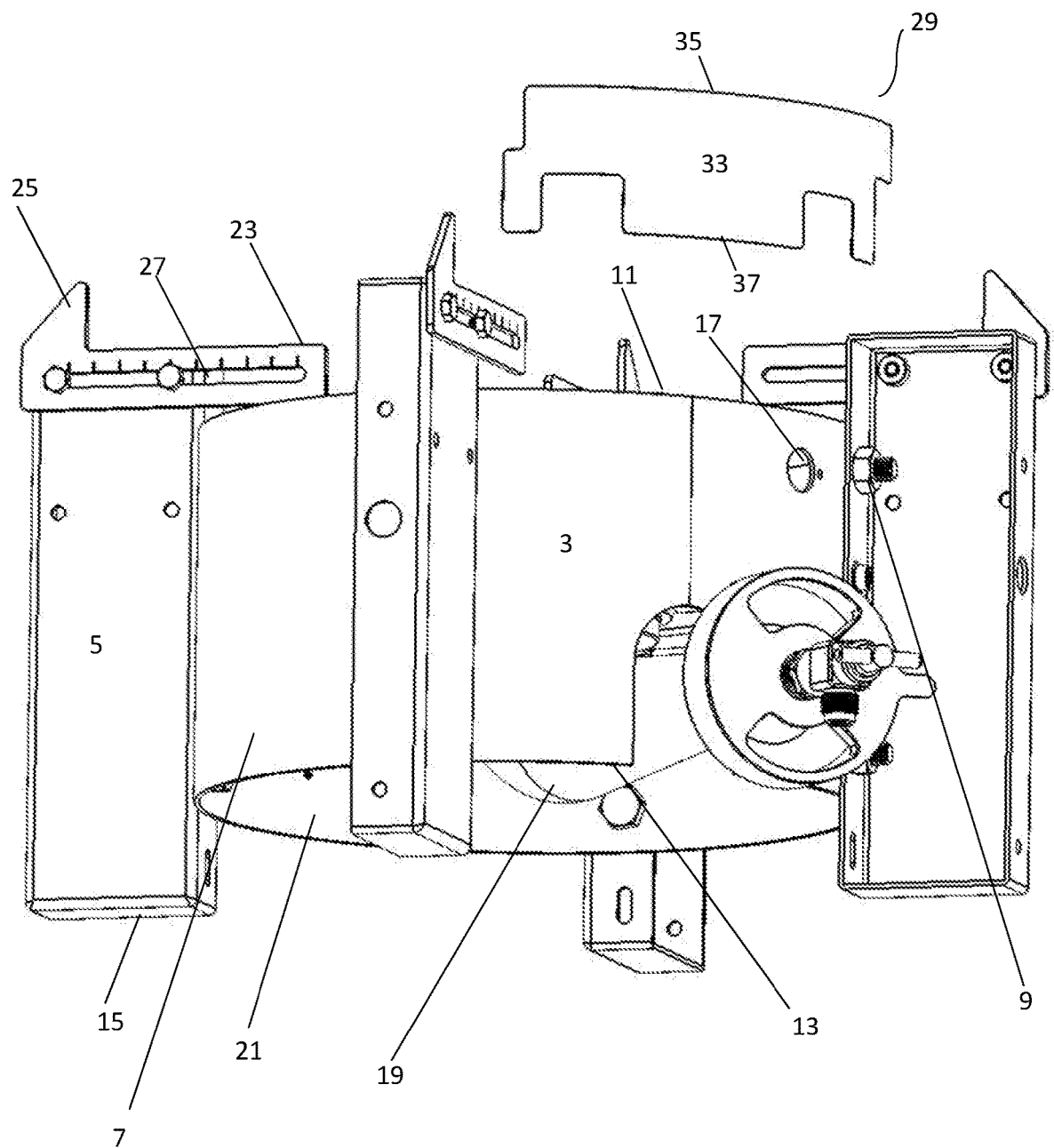
FIG. 1 is a perspective view of an exemplary embodiment of a strategic heat shield and burner assembly.

Referring to FIG. 1, an exemplary embodiment of a strategic heat shield and burner assembly is shown. The burner assembly 1 has a central member 3 that can be any suitable shape, such as cylindrical or a rectangular prism, with an opening formed through the central member 3. A plurality of legs 5 is coupled to the central member 3. The burner assembly 1 can be in any suitable configuration, including but not limited to, a circular or rectangular configuration. FIG. 1 illustrates one exemplary embodiment where the legs 5 are coupled to the exterior wall 7 of the central member 3 with fasteners 9, such as bolts, positioned through apertures in the central member and aligned with an aperture in the leg. A nut may be used to securely affix the two components together. In some embodiments of the present invention, the legs can extend past the top 11 and bottom 13 portion of the central member.

Additionally, legs 5 can be configured to allow for extensions to be coupled to the bottom portion 15 of each leg to create a greater distance from the top of the central member 3 to the ground. This modularity is advantageous in situations where varying sizes of vessels are used interchangeably with the burner assembly, and there is a need to adjust the height of the burner assembly to better access the vessel during operation. The central member 3 can also have multiple apertures 17 to allow air to flow into the interior of the central member. One opening in the wall of the central member can be used to allow a burner 19 to be coupled to the central member and optionally connected to a supply of fuel, such as gas in a portable propane tank or a natural gas line.

The burner 19 can be positioned at any suitable location along the length of the central member 3. Moreover, any suitable burner can be used. One exemplary embodiment of the present invention can use a multi-port burner for equal heat distribution to the bottom of a vessel. The central member 3 can be designed to approximate the shape of a burner creating very little space between the edge of the burner 19 and the interior wall 21 of the central member 3. Further, the central member can function as a wind guard for a burner to help prevent excessive wind from extinguishing the lit burner. The invention can also improve the performance of the wind protection to a large degree.

In an alternative embodiment, at least one vessel support member 23 can be integrated into the burner assembly. In one preferred embodiments, the top edge of the central member acts as a vessel support member. In another exemplary embodiment illustrated by FIG. 1, vessel support members 23 can be coupled or integrated to either the central member or to each of the legs. For example, the central member 3 can have four support legs 5 attached to the exterior of the central member 3 with vessel support members 23 coupled to the top of each of the legs 5 by any suitable coupling method, such as a fastener system, e.g., a nut and bolt. In this embodiment, the vessel support members 23 securely hold and support a vessel above the burner 19 and the central support member 3. The vessel support member 23 can also have a protrusion 25 on the end distal to the central member to better support a vessel from accidentally sliding off the top edge of the vessel support member 23 and to guide in the centering of the vessel on the burner 19 for proper stability and weight distribution.

The vessel support members 23 can also be configured in a manner to allow the burner assembly 3 to securely hold and support a variety of vessels with differing sizes. In one exemplary embodiment, the vessel support members 23 can have a central channel 27 running from a proximate end of the support member to a distal end of the support member. The vessel support members 23 can be secured by at least one fastener through the channel of the vessel support member 23 to a leg 5 of the burner assembly 3. If a fastener is used, the fastener can be loosened to allow the vessel support member to be moveably adjusted to accommodate a pre-determined sized vessel. The fastener can then be tightened to securely hold the vessel support member 23 in place.

In yet another exemplary embodiment, a central member can be formed from a plurality of legs. A burner can be attached to the central member. To help protect the burner from gust of wind and other external environments, a wind shield can be attached to the assembly to ensure uniform heat distribution. A strategic heat shield can be attached to various portions of the assembly, including but not limited to, a central member, a wind guard, at least one leg, or a vessel itself. The strategic heat shield can be in the same plane as the wind guard or central member, or alternatively, spaced away from the wind guard or central member depending on the application and the size of the vessel. In one exemplary embodiment, the central member can act as a wind guard. Conversely, in another alternative embodiment, the central member can act as its own stand and the top edge of the central member can be used to support a vessel.

In one exemplary embodiment, a strategic heat shield 29 can be removably coupled to a central member 3 or to one or more of the legs 5. As seen in FIG. 2, the heat shield has an interior 31 and exterior 33 surface and a top 35 and bottom edge 37. The strategic heat shield 29 can be composed from a variety of heat insulating or non-insulating materials, such as a metal. The heat shield itself could also be coated in a heat insulating material, such as a ceramic coating. In one exemplary embodiment, the heat shield 29 can approximate the shape of a portion of the top edge of the central member 3.

Figure 2A:
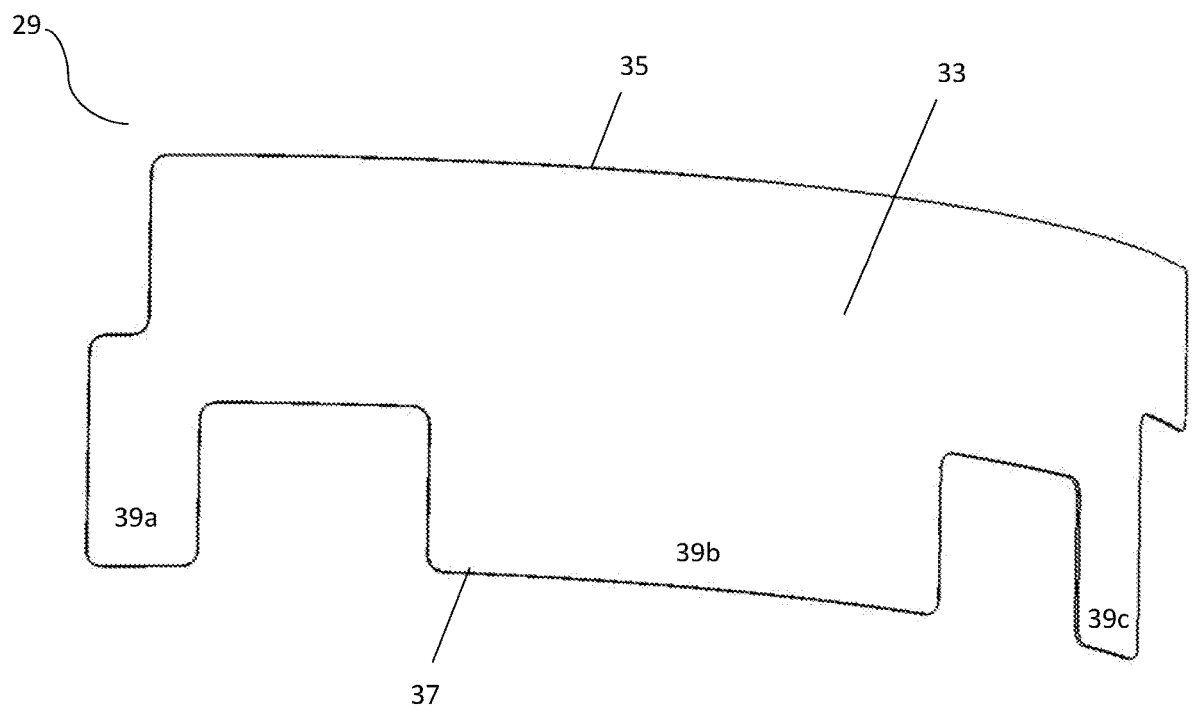
FIG. 2a is a perspective view of an exemplary embodiment of a strategic heat shield.
Figure 2B:
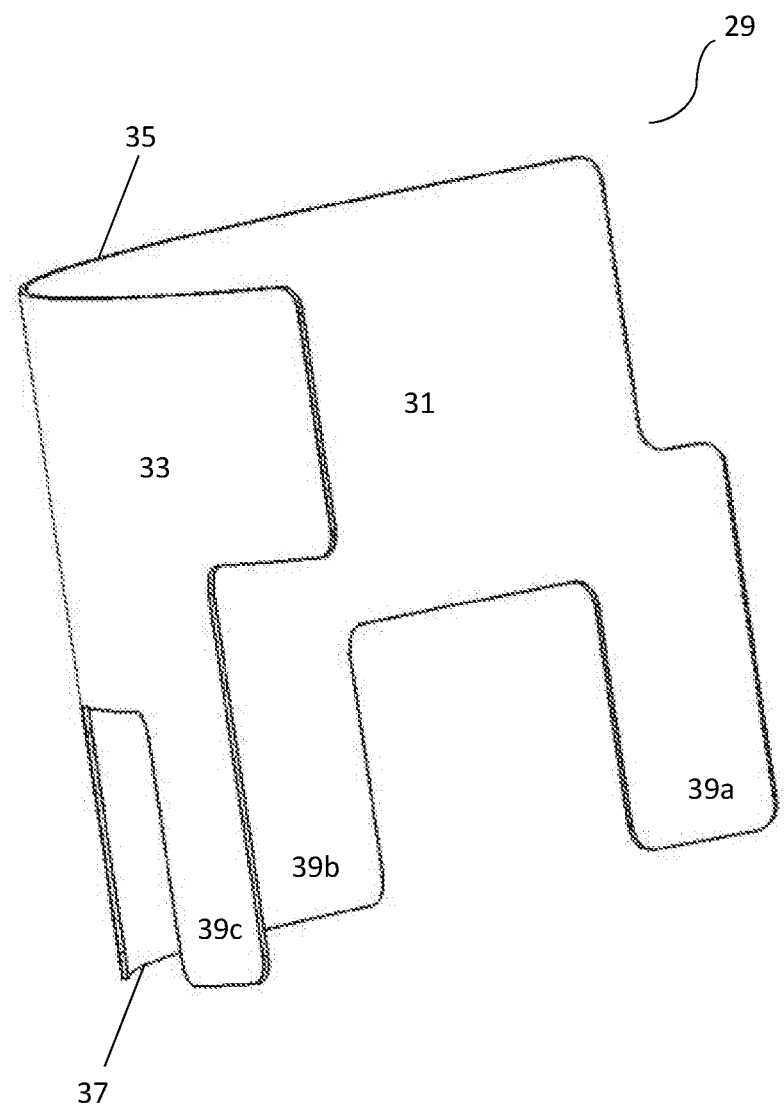
FIG. 2b is another perspective view of an exemplary embodiment of a strategic heat shield.

As seen in FIGS. 1 and 2A-B, one exemplary embodiment of the invention is a heat shield 29 configured to have a plurality of cutouts from the bottom edge of the heat shield, forming tabs 39a, 39b, and 39c that are configured to couple to the top edge of the central member 3 without the use of fasteners. In one exemplary embodiment, coupling can be accomplished by positioning the top edge of the central member with a central tab 39b located on the outside wall 7 of the central member. The two adjacent tabs 39a and 39c formed on either side of the central member 3 are located on the interior of the central member 3 creating enough pressure between the tabs 39a and 39c and the central member 3 to hold the heat shield 29 in place. A user can easily remove or relocate the heat shield 29 in a variety of positions along the top edge of the central member 3 as necessary. Alternatively, the heat shield tabs 39a, 39b, and 39c can be oriented in the opposite configuration where the adjacent tabs 39a and 39c are located on the interior of the central member, and the central tab 39b is located on the exterior of the central member. Similarly, the heat shield 29 can be coupled to the central member 3 or to a leg 5 with fasteners, such as a nuts and bolts.

The strategic heat shield can be coupled to a central member to deflect excessive heat created by the burner away from an external environment proximate to the exterior of the heat shield, such as a portion of the exterior wall of a vessel 100. The heat shield can be formed and configured in a manner where the top edge of the heat shield is on the same plane as the top edge of each of the vessel support members 23 when the heat shield is coupled to the central member or legs. By having the top edge of the heat shield on the same plane as the top edges of the vessel support members, the burner assembly is able to provide for a level surface for the base of a vessel to rest upon, while also preventing excess heat from permeating through space between the top edge of the heat shield and the vessel 100. The vertical orientation also directs radiation away from the vessel 100 thereby significantly reducing the heat transferred to the auxiliary equipment 101, such as instrumentation located on the exterior surface of a vessel.

In yet another embodiment, the strategic heat shield can be coupled to at least a portion of a vessel, such as a kettle. Any suitable means can be used to removably or permanently couple the heat shield to said vessel. The heat shield can be formed to the contour of the kettle. The heat shield can be coupled to the exterior surface, near the base of the vessel. In one embodiment, a portion of the heat shield can extend below the base of the vessel. Similarly, a strategic heat shield can be coupled to the burner frame. In some embodiments, the strategic heat shield can extend above the surface of the burner acting as a centering device for a vessel.

Figure 3:
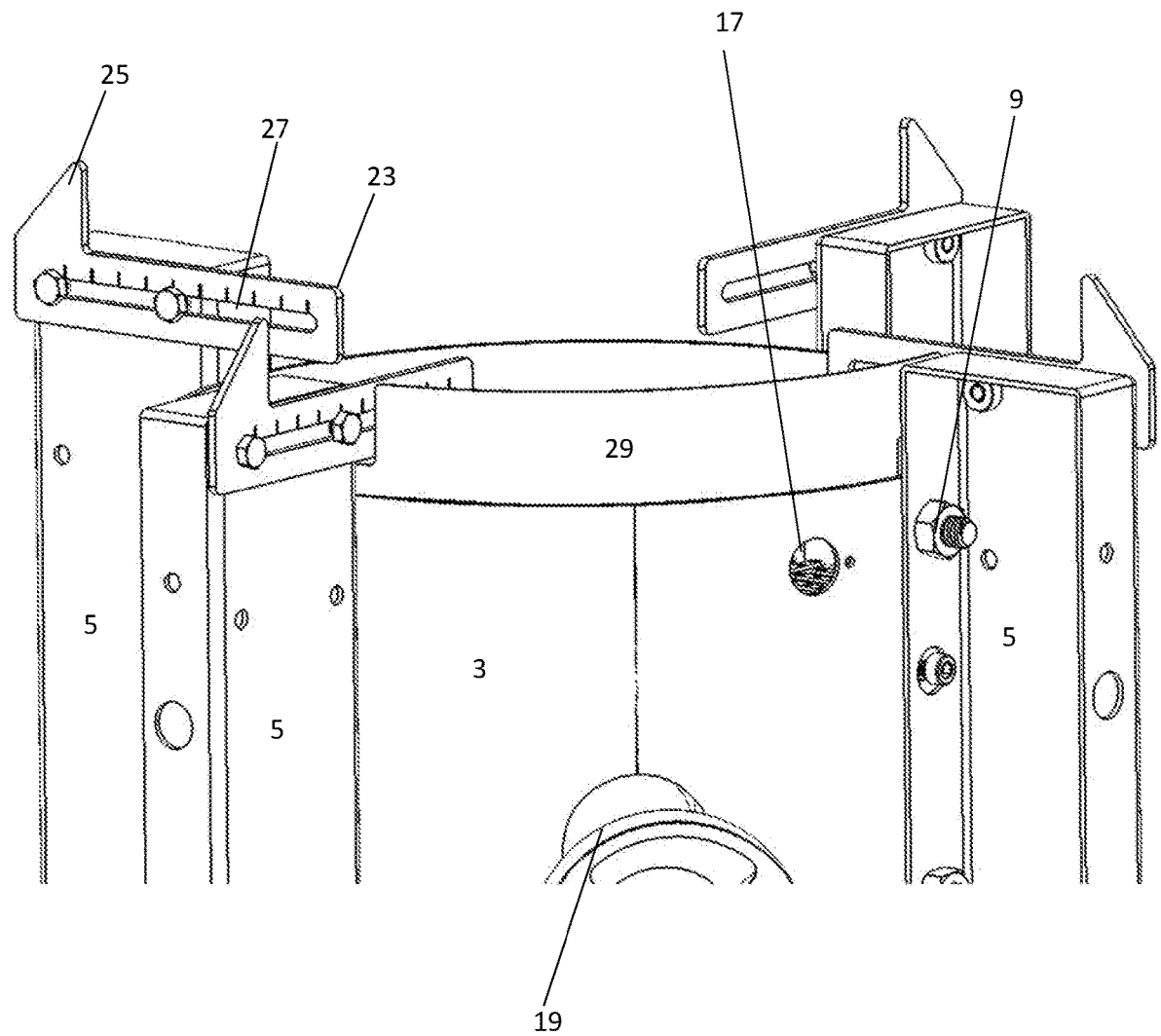
FIG. 3 is a perspective view of an exemplary embodiment of a strategic heat shield coupled to a burner assembly.

As seen in FIG. 3, by providing a nearly flush fitting or drastically minimizing the distance between the heat shield and the bottom of the vessel, the heat shield prevents excessive heat dispersion and exhaust to flow towards the external face vessel's surface in relation to the heat shield. The excessive heat exhaust is deflected away creating a safer environment on the external wall surface of a vessel for auxiliary instruments, such as gauges, valves, and sensors, a user might employ when operating the burner assembly with a vessel during the process of brewing beer. By utilizing the heat shield on only one side of the central member, air is still allowed to freely flow into the central member and provide adequate oxygen levels for the burner to properly combust and heat the vessel. Specifically, the strategic heat shield can reduce the heat on the vessel's auxiliary equipment from about 300° F. to below about 250° F., or below about 225° F., or below about 200° F., or below about 175° F., or below about 150° F., or below about 125° F., or below about 100° F.

A standalone strategic heat shield can also be used in a similar manner. The strategic heat shield can be comprised of a heat shield having an interior and exterior surface and a top edge and a bottom edge shaped to match a defined shape of an object, such as, e.g., a burner assembly or vessel. The heat shield can be configured to be coupled to an object and deflect heat created by a burner away from an external environment proximate to the exterior surface of the heat shield. The strategic heat shield can have a generally curvelinear shape that approximates the exterior edge of an object, such as a vessel. The strategic heat shield can be coupled to various elements of a burner assembly, including but not limited to a burner, a stand supporting a burner, a wind guard, a kettle or pot, or any other suitable place to deflect heat away from the exterior surface of a kettle or pot.

Figure 4:
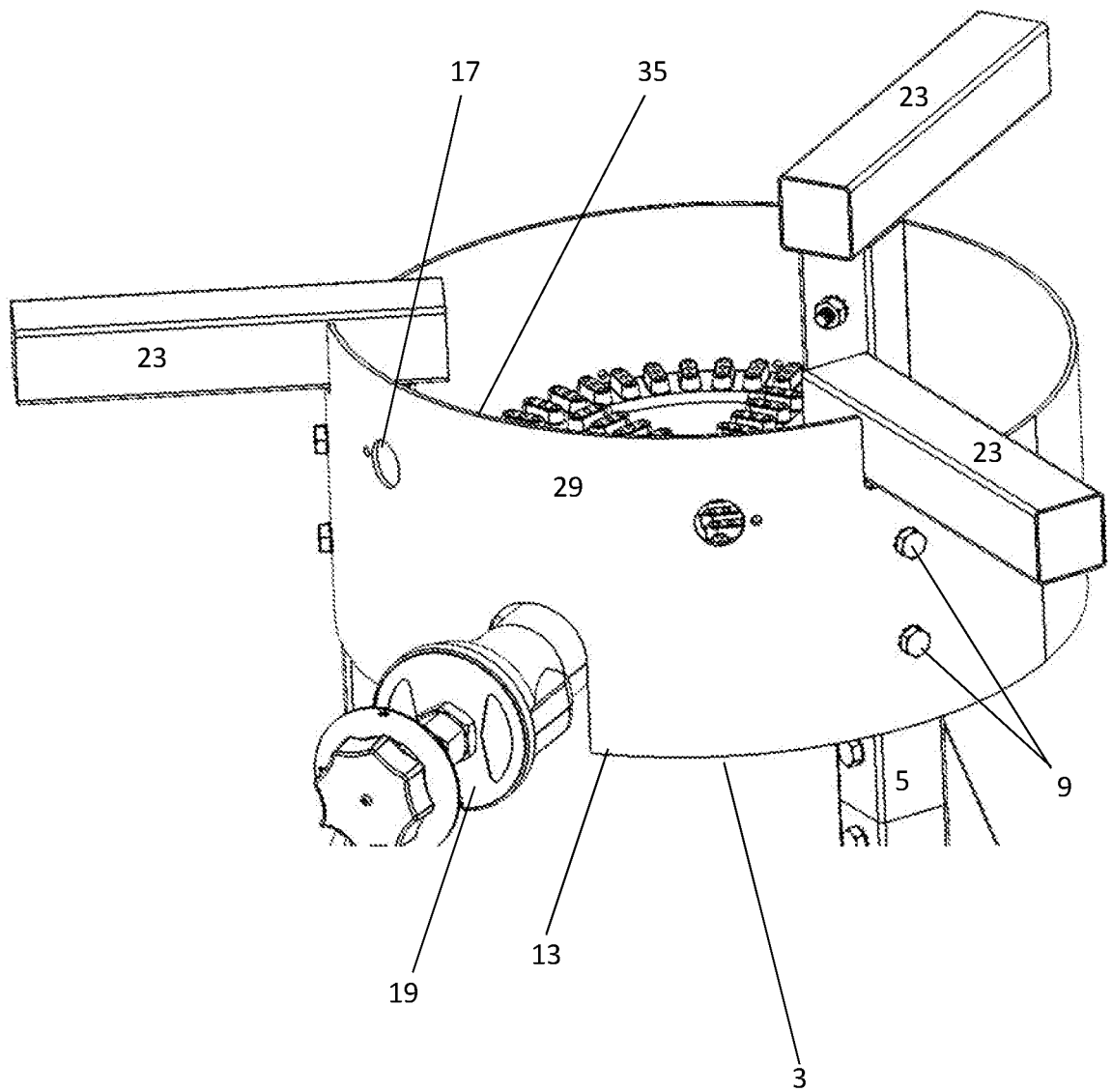
FIG. 4 is a perspective view of an exemplary embodiment of a strategic heat shield integrally formed into a central member.

Furthermore, a strategic heat shield 29 can be integrally formed into a central member 3 as shown in FIG. 4. The strategic heat shield can be formed as part of the central member 3 and, in some embodiments, can further include apertures 17 to allow air flow to the burner. By forming the heat shield 29 as part of the central member 3, there is no issue that the heat shield may become decoupled from the central member. However, this does require the user to position the vessel in the desired location in relation to the heat shield 29 so as to prevent excess heat from affecting instrumentation or components of the vessel. The vessel support members 23 can be in the same plane as the top portion 35 of the integrated heat shield 29 to provide an even surface for a vessel to rest upon.

Figure 5A:
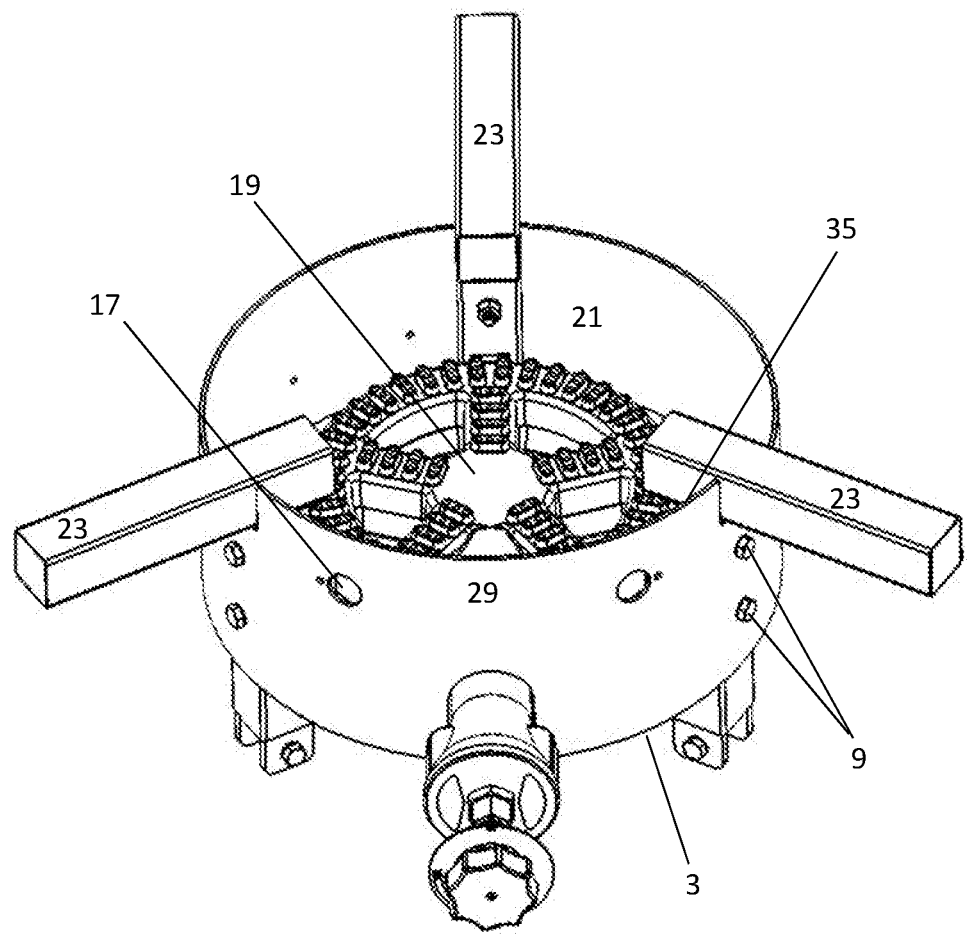
FIG. 5a is a perspective view of a burner assembly without modular support members.
Figure 5B:
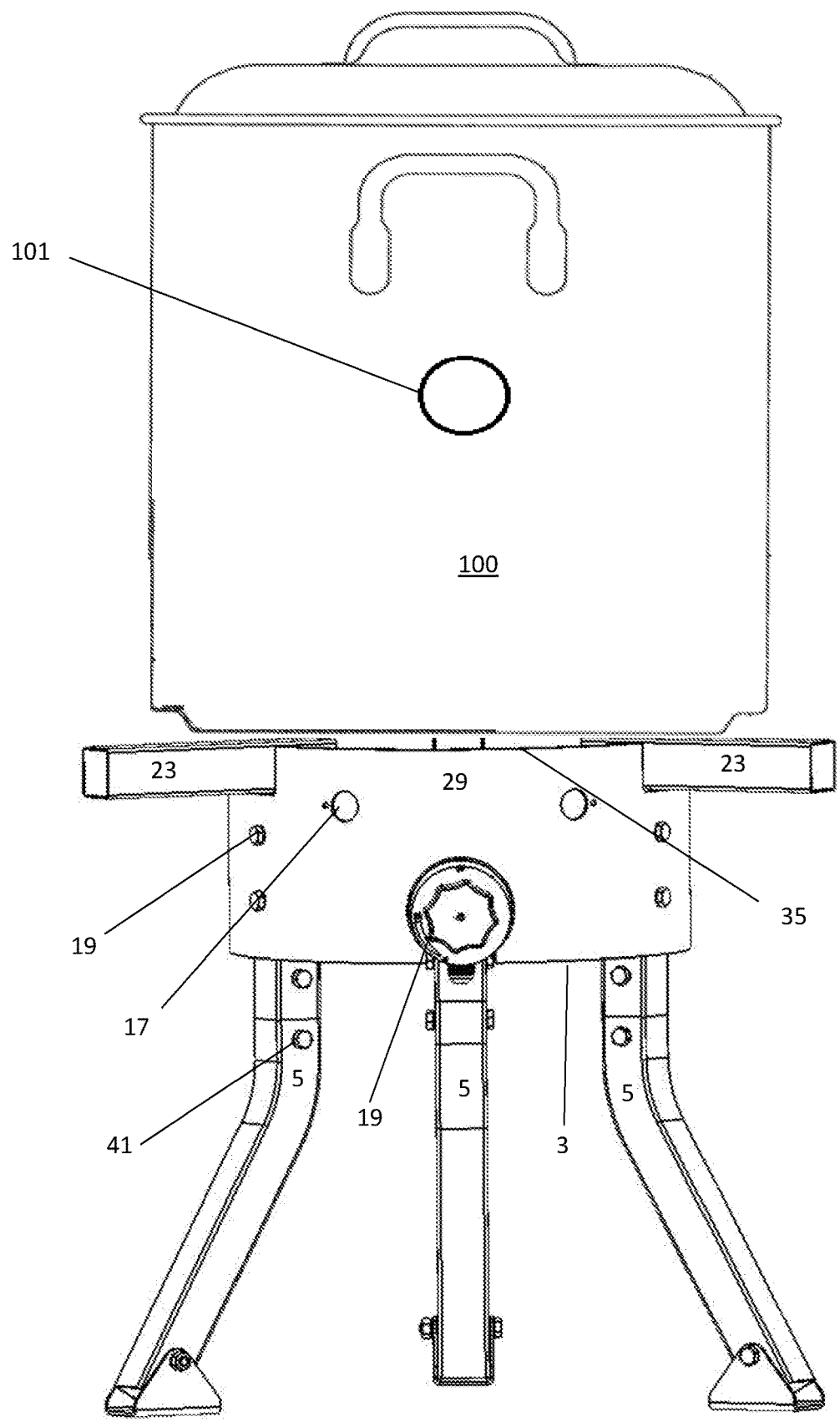
FIG. 5b is a perspective view of a burner assembly with one set of modular support members on each support member.

As shown in FIG. 5A-B, another aspect of the present invention is the use of modular supporting members that may be configured to increase and decrease the height of the burner assembly to facilitate the brewing process and transfer of liquid between vessels. The modular supporting members can be pre-determined lengths of various length or the same length, and can be coupled to one another to achieve various height settings. Alternatively, each individual member can have the ability to be adjusted to various lengths to provide suitable functionality for different applications. One exemplary embodiment can use modular supporting members providing a low height setting for bench mounting, while a medium height setting can be used for draining a liquid into a fermenter, and a tall height setting can be used from draining a liquid into another kettle. In combination, the various height settings can be used to create a multi-level setup for draining from an upper kettle, then into a lower kettle and lastly into a fermenter.

The adjustable or modular legs 5 can use any suitable coupler 41 for coupling to one another, such as a spring loaded pin coupled to the inner portion of the leg 5 that can then be depressed and located in the appropriate aperture of the external portion of the support member. The adjustable modular legs can have an inner portion that slides freely within an exterior portion and has a securing pin coupled to the inner portion that locates pre-determined apertures in the exterior portion to adjust the height. The pre-determined length legs 5 can also all be the same length and have a coupling mechanism identical to the adjustable legs to allow the modular legs to be interconnected between one another to form various length support members. One end of the support member can be inserted to allow the portion to fit inside the inner portion of another support member.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A strategic heat shield and burner assembly comprising:
   (a) a stand having a central member defining a wall with a central opening therethrough and having a top edge, a first wall surface and a second wall surface;
   (b) a burner positioned centrally within the central member and coupled to the central member,
      wherein said burner is positioned to radiate heat to a vessel placed above the burner on the stand, wherein the vessel has a bottom wall portion and exterior sidewall portion; and
   (c) a removeably couplable heat shield configured to approximate the shape of the top edge of the central member, wherein the heat shield comprises an interior surface, an exterior surface, and a top edge and a bottom edge,
      wherein the bottom edge heat shield includes a central tab, a first side tab and a second side tab, wherein the heat shield can be removeably coupled to the top edge of the central member without the use of additional fasteners by positioning the top edge of the central member with the central tab positioned against the first wall surface of the central member, and the first and second side tabs are positioned on either side of the central tab and positioned against the second wall surface of the central member,
      wherein the top edge of the heat shield is positioned beneath the bottom wall portion of the vessel and oriented to be substantially proximate the vessel, wherein the heat shield is further configured to shield the exterior side wall portion of the vessel from heat created by the burner and said heat is primarily deflected to the bottom wall portion of the vessel.

2. The strategic heat shield and burner assembly of claim 1, wherein said heat shield is made of stainless steel and wherein said exterior wall portion further comprises at least one instrumentation component, wherein the heat shield is configured to reduce heat emitted from the burner from damaging the instrumentation.

3. The strategic heat shield and burner assembly of claim 1, wherein said stand further comprises:
   a plurality of supporting legs;
   at least one vessel support member,
   wherein said legs are coupled to the central member and the vessel support member is in the same plane with or above the central member.

4. The strategic heat shield and burner assembly of claim 3, wherein coupled to the top of each said leg is a vessel support member having a proximate end and a distal end.

5. The strategic heat shield and burner assembly of claim 1, wherein said central member is configured to act as a vessel support member.

6. The strategic heat shield and burner assembly of claim 1, wherein said heat shield has generally curvelinear shape and said heat shield is positioned beneath the vessel, wherein the positioning of the first side tab and second side tab against the second wall surface and the central tab against the first wall surface exerts a pressure to maintain the coupling of the heat shield to the central member.

7. The strategic heat shield and burner assembly of claim 4, wherein said vessel support members have a vertical protrusion on the distal end of the vessel support members, wherein said vertical protrusion is configured to support a vessel and limit the horizontal movement of a vessel resting on the vessel support members.

8. The strategic heat shield and burner assembly of claim 3, wherein said vessel support members have a central channel running from distal end to proximate end configured to allow said vessel support member to be adjustably moveable to support varying sizes of vessels.

9. The strategic heat shield and burner assembly of claim 1, wherein said burner is a multi-nozzle burner.

10. The strategic heat shield and burner assembly of claim 1, wherein said heat shield is coated with a heat resistant material.

11. The strategic heat shield and burner assembly of claim 3, wherein said legs are configured to be modular and accept leg extensions.

12. The strategic heat shield and burner assembly of claim 1, wherein said central member is configured to act as a wind guard.

13. The strategic heat shield and burner assembly of claim 1, wherein said central member is configured to act as a plurality of legs.

14. The strategic heat shield and burner assembly of claim 3, wherein said top edge of the heat shield is positioned to at the same plane as the vessel support member.

* * * * *